United States Patent
Tang et al.

(10) Patent No.: US 12,479,421 B2
(45) Date of Patent: Nov. 25, 2025

(54) MODULAR NETWORK BASED KNOWLEDGE SHARING FOR MULTIPLE ENTITIES

(71) Applicant: NEC Laboratories America, Inc., Princeton, NJ (US)

(72) Inventors: LuAn Tang, Pennington, NJ (US); Wei Cheng, Princeton Junction, NJ (US); Haifeng Chen, West Windsor, NJ (US); Zhengzhang Chen, Princeton Junction, NJ (US); Yuxiang Ren, Tallahassee, FL (US)

(73) Assignee: NEC Corporation, Tokyo (JP)

( * ) Notice: Subject to any disclaimer, the term of this patent is extended or adjusted under 35 U.S.C. 154(b) by 1020 days.

(21) Appl. No.: 17/493,323

(22) Filed: Oct. 4, 2021

(65) Prior Publication Data

US 2022/0111836 A1    Apr. 14, 2022

Related U.S. Application Data

(60) Provisional application No. 63/089,566, filed on Oct. 9, 2020.

(51) Int. Cl.
*G06F 18/214* (2023.01)
*B60W 30/08* (2012.01)
(Continued)

(52) U.S. Cl.
CPC ......... *B60W 30/08* (2013.01); *G06F 18/2148* (2023.01); *G06N 3/082* (2013.01); *G06N 5/02* (2013.01)

(58) Field of Classification Search
CPC .... B60W 30/08; G06F 18/2148; G06N 3/082; G06N 5/02
See application file for complete search history.

(56) References Cited

U.S. PATENT DOCUMENTS 10,210,487 B2 *   2/2019   Penilla ................... G07C 5/006
11,436,504 B1 *   9/2022   Lukarski ................. G06N 5/04
(Continued)

FOREIGN PATENT DOCUMENTS

KR   1020120107774 A   10/2012
KR   102018010850 A   10/2018

OTHER PUBLICATIONS

Cheng et al., "Meta multi-task learning for sequence modeling", Proceedings of the AAAI Conference on Artificial Intelligence. vol. 32, No. 1. Apr. 27, 2018. pp. 5070-5077.
(Continued)

*Primary Examiner* — Beau D Spratt
(74) *Attorney, Agent, or Firm* — Vincent Duffy; Joseph Kolodka

(57) ABSTRACT

A method for vehicle fault detection is provided. The method includes training, by a cloud module controlled by a processor device, an entity-shared modular and a shared modular connection controller. The entity-shared modular stores common knowledge for a transfer scope, and is formed from a set of sub-networks which are dynamically assembled for different target entities of a vehicle by the shared modular connection controller. The method further includes training, by an edge module controlled by another processor device, an entity-specific decoder and an entity-specific connection controller. The entity-specific decoder is for filtering entity-specific information from the common knowledge in the entity-shared modular by dynamically assembling the set of sub-networks in a manner decided by the entity specific connection controller.

20 Claims, 8 Drawing Sheets

(51) Int. Cl.
    *G06N 3/082*     (2023.01)
    *G06N 5/02*     (2023.01)

(56) References Cited

U.S. PATENT DOCUMENTS

| | | | | |
|---|---|---|---|---|
| 11,978,266 | B2 * | 5/2024 | Arar | B60W 50/14 |
| 2018/0275657 | A1 * | 9/2018 | You | G06N 3/08 |
| 2019/0163193 | A1 * | 5/2019 | Lingg | G01C 21/3878 |
| 2019/0333291 | A1 * | 10/2019 | Liu | G06F 16/00 |
| 2020/0301772 | A1 * | 9/2020 | McMenemy | G05B 23/0243 |
| 2020/0364953 | A1 * | 11/2020 | Simoudis | G06N 20/00 |
| 2021/0233196 | A1 * | 7/2021 | Qin | G06Q 10/1057 |
| 2023/0292117 | A1 * | 9/2023 | Hemantharaja | H04W 12/069 |

OTHER PUBLICATIONS

Kirsch et al., "Modular networks: Learning to decompose neural computation", 32nd Conference on Neural Information Processing System. vol. 31. Dec. 3-8, 2018. pp. 2408-2418, 2018.

* cited by examiner

MODULAR NETWORK BASED KNOWLEDGE SHARING FOR MULTIPLE ENTITIES

RELATED APPLICATION INFORMATION

This application claims priority to U.S. Provisional Patent Application No. 63/089,566, filed on Oct. 9, 2020, incorporated herein by reference in its entirety.

BACKGROUND

Technical Field

The present invention relates to networks and more particularly to modular network based knowledge sharing for multiple entities.

Description of the Related Art

A vehicle is a complex system with multiple components. The system faults of a vehicle can occur on different components such as the engine, battery, gears, and so forth. Such faults can lead to severe economic losses and safety issues. Modern cars are installed with large number of sensors. These sensors report the corresponding state in terms of streaming data. It is thus appealing to predict and prevent the faults based on the sensor data.

To predict the possible failure in advance, the system needs to train a deep neural network model from the car sensor data. Typically, the training data should be large and complete, and it requires a relatively long period (e.g., 1 or 2 months) to collect such big data. However, if a new car is added to the monitoring system, it does not have much if any historical data on the new car. The problem is on transferring the knowledge and model from other entities to the new one, which is called a cross entity transfer task.

Traditional machine learning methods tend to train a unified model for all entities, which usually ignores the different features and attributes of each entity. But when trying to train a personalized model for each entity, the data of a single entity utilized for training is often insufficient, especially for emerging entities that lack historical data.

Transfer learning is a promising method to deal with the problem of insufficient training data, but the current transfer learning methods mainly focus on the transfer between different domains. In addition, in the process of training the personalized model, the security of data privacy also needs to be handled properly.

SUMMARY

According to aspects of the present invention, a method for vehicle fault detection is provided. The method includes training, by a cloud module controlled by a processor device, an entity-shared modular and a shared modular connection controller. The entity-shared modular stores common knowledge for a transfer scope, and is formed from a set of sub-networks which are dynamically assembled for different target entities of a vehicle by the shared modular connection controller. The method further includes training, by an edge module controlled by another processor device, an entity-specific decoder and an entity-specific connection controller. The entity-specific decoder is for filtering entity-specific information from the common knowledge in the entity-shared modular by dynamically assembling the set of sub-networks in a manner decided by the entity specific connection controller.

According to other aspects of the present invention, a system for vehicle fault detection is provided. The system includes a cloud module, controlled by a processor device, for training an entity-shared modular and a shared modular connection controller. The entity-shared modular stores common knowledge for a transfer scope, and is formed from a set of sub-networks which are dynamically assembled for different target entities of a vehicle by the shared modular connection controller. The system further includes an edge module controlled by another processor device, for training an entity-specific decoder and an entity-specific connection controller. The entity-specific decoder is for filtering entity-specific information from the common knowledge in the entity-shared modular by dynamically assembling the set of sub-networks in a manner decided by the entity specific connection controller.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to modular network based knowledge sharing for multiple entities.

In accordance with various embodiments of the present invention, a Modular Network based Knowledge Sharing Model (MNKS) is proposed to extend transfer learning to entity-level in order to learn effective personalized models. In an embodiment, MNKS uses modular networks to share common knowledge between entities, and ensures the personalization of models of different entities through reinforcement learning-based network routing. In an embodiment, MNKS can employ an edge computing framework to keep data privacy.

The transfer scope of cross-entity transfer learning is based on the local community where the entity is located. It is presumed that entities in the same local community are more relevant and have more common knowledge. Local communities can be determined by the connections of a task specific graph.

MNKS includes an entity-shared modular to extract common knowledge shared by multiple entities and an entity-specific decoder to keep personalized features for each entity. The entity-shared modular is modularized into multiple layers of subnetworks and the entity-specific decoder includes several sub-decoders. Modularity enables the entity-shared modular to have enough capability to extract common knowledge from local communities of varying sizes, and the sub-networks of the entity-shared modular to learn common knowledge in different local communities through different assembly methods. The assembly methods of the entity-shared modular are determined by a shared modular connection controller, which is responsible for connecting subnetworks.

In embodiments of the present invention, Reinforcement Learning (RL) is used to train the shared modular connection controller. The entity-specific decoder includes several sub-decoders, which learn personalized features from specific entities' data. The network structure of these sub-decoders is learned by an entity-specific connection controller, which is trained based on the specific entity's data through reinforcement learning. MNKS keeps data privacy by an edge computing framework: the entity-shared modular running in the cloud-side processes multiple entities' data and only shares the learned model of common knowledge to each entity. The individual entity in the edge-side can only reach its own data to avoid infringing on entities' privacy data.

Figure 1:
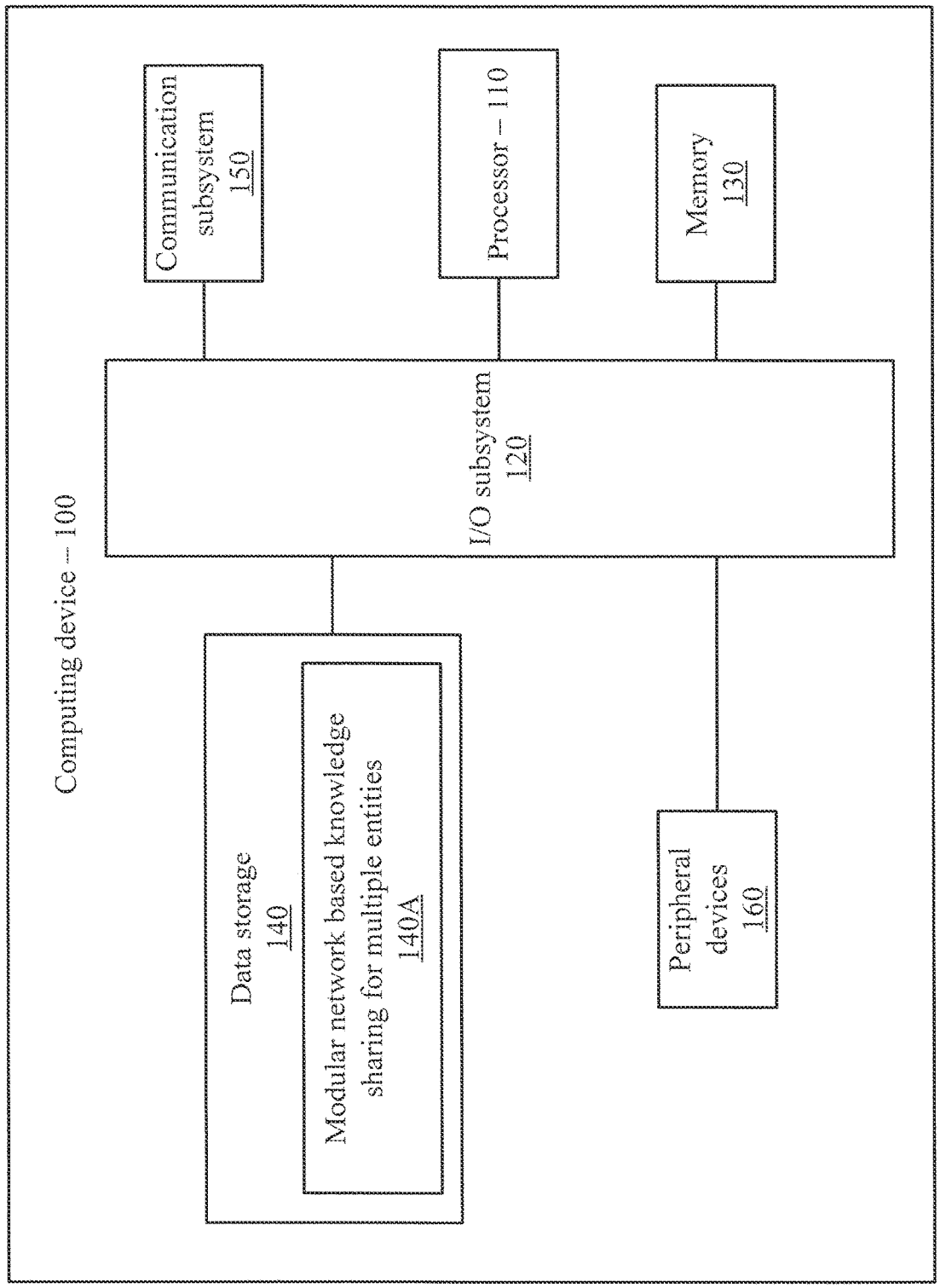
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform modular network based knowledge sharing for multiple entities.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for modular network based knowledge sharing for multiple entities. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, Infini-Band®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
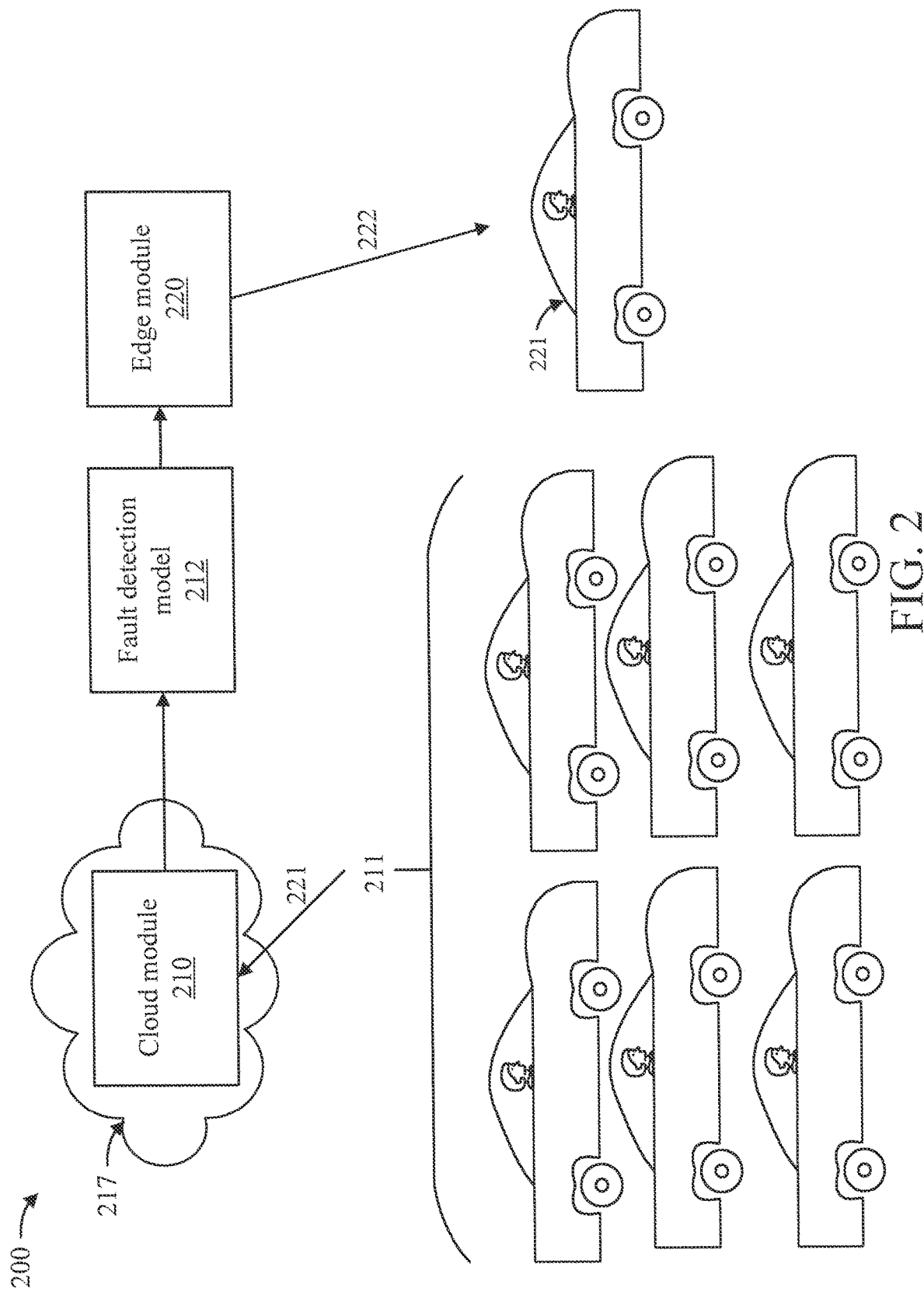
FIG. 2 is a block diagram showing an overall framework of a Vehicle Intelligent Early Warning (VIEW) system, in accordance with an embodiment of the present invention.

These and other variations of a hardware processor subsystem are also contemplated in accordance with embodiments of the present invention FIG. 2 is a block diagram showing an overall framework 200 of a Vehicle Intelligent Early Warning (VIEW) system. 210, in accordance with an embodiment of the present invention. There are two major elements in the system, namely a cloud module 210 and an edge module 220. The cloud module 210 is in the cloud 217 and is designed for training 221 fault sign models from historical data and the edge module 220 is proposed for online monitoring 222 and report warnings in real time.

The cloud module 210 is installed on the cloud server. The cloud module 210 takes the big data collected from multiple cars 211 as input and outputs the learned model of fault sign detection 212. In an embodiment, the cloud module can rely on a Graphics Processing Unit (GPU) for computation of deep neural networks and the computation load is heavy.

In contrast, the edge module 220 takes the learned fault sign model 212 as input. The edge module is implemented in an Electronic Control Unit (ECU) on the cars and monitors the streaming sensor data. The edge module 220 is a lightweight module and can generate the warnings of possible faults in an online monitoring of a vehicle 221 by only one scan of the data.

Figure 3:
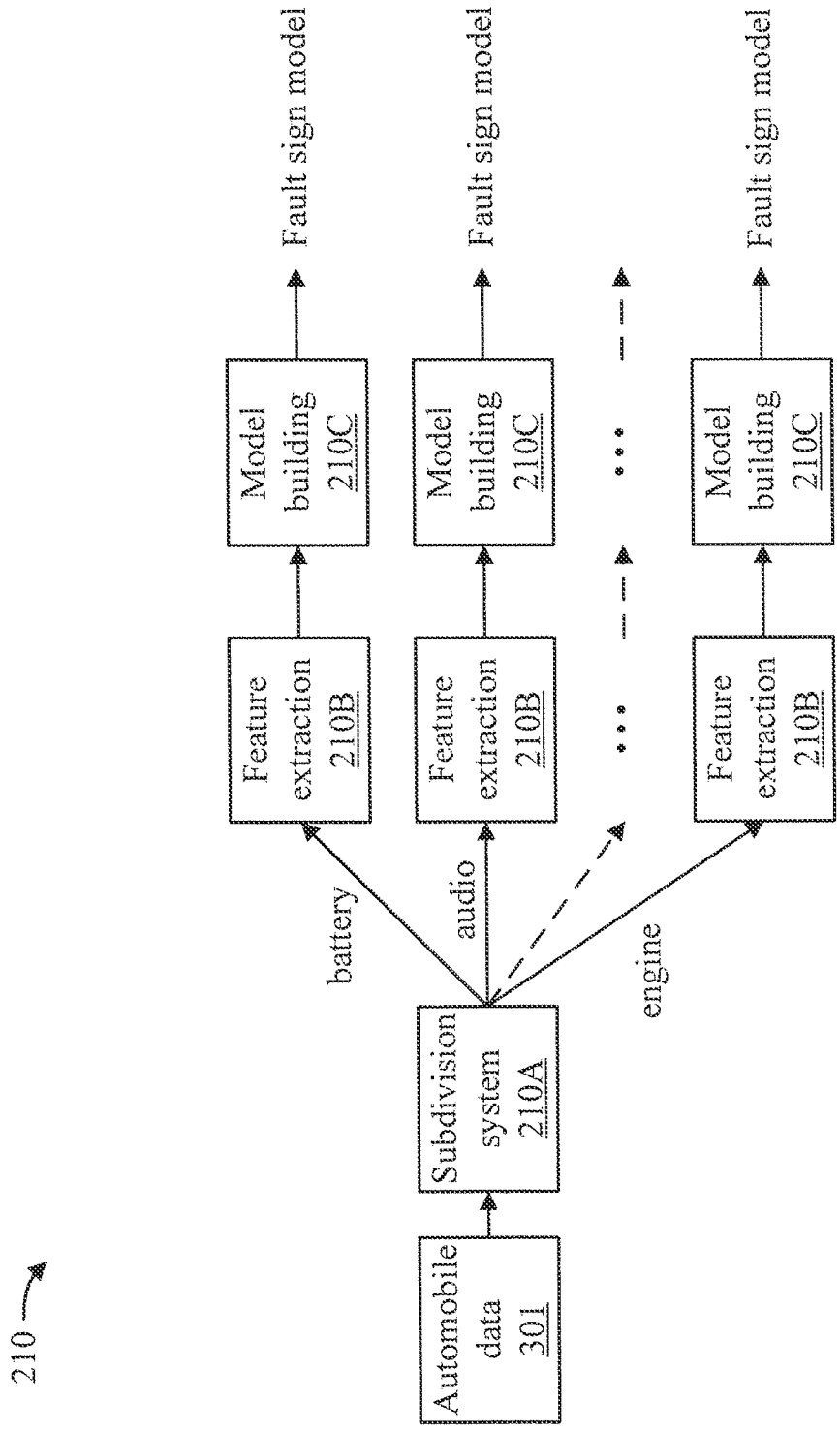
FIG. 3 is a block diagram further showing the cloud module of FIG. 2, in accordance with an embodiment of the present invention.

The cloud module 210 is the main component of model building. The cloud module 210 takes the automobile data 301 for input and outputs the fault sign models. FIG. 3 is a block diagram further showing the cloud module 210 of FIG. 2, in accordance with an embodiment of the present invention. There are three major components of the cloud module 210, namely (1) subsystem division 210A, (2) feature extraction 210B, and (3) model building 210C.

The subsystem division 210A clusters the sensor data from cars into several groups based on their relationship;

The feature extraction 210B retrieves the main features from both raw time series and correlation graphs from data;

The model building 210C computes both a fault score and an anomaly score model to detect unknown faults.

One major problem of VIEW is that, for some newly monitored cars to the system, the historical data is very limited, and it is desired to transfer the existing model to monitor the new cars. It is a problem of cross-entity transfer learning.

Figure 4:
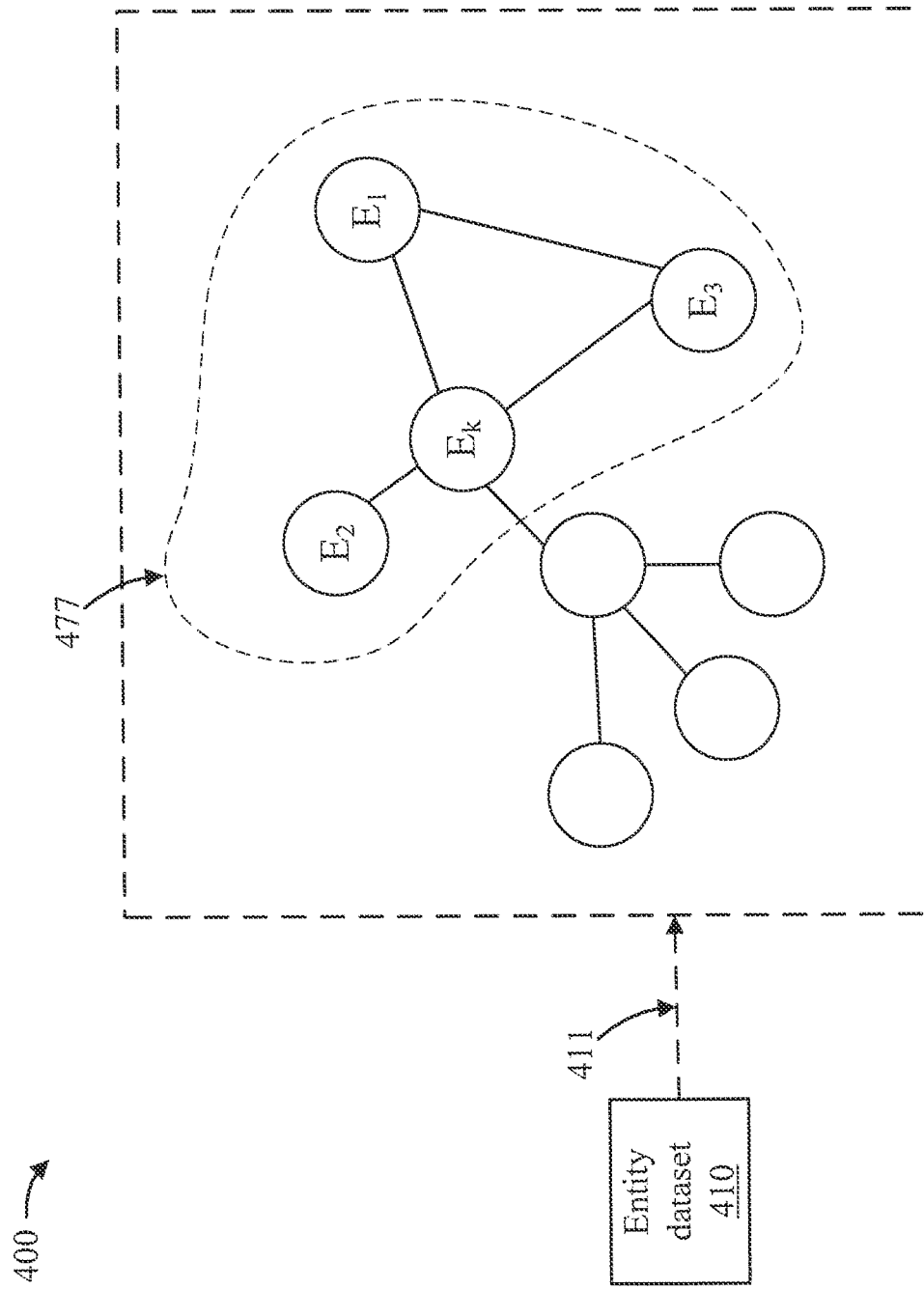
FIG. 4 is a block diagram showing an example of cross-entity transfer learning 400, in accordance with an embodiment of the present invention.

FIG. 4 is a block diagram showing an example of cross-entity transfer learning 400, in accordance with an embodiment of the present invention.

E1, E2 and E3 are three entities with existing models learned from their historical data. E1, E2, and E3 are obtained using task specific correlations 411 from an entity dataset 410. Ek is a new entity added to the system. Ek does not have much historical data. The solution provided by the present invention is to transfer the knowledge of E1, E2, E3's models to Ek, and generate a new model for Ek with limited historical data. The transfer scope is indicated by reference numeral 477.

Figure 5:
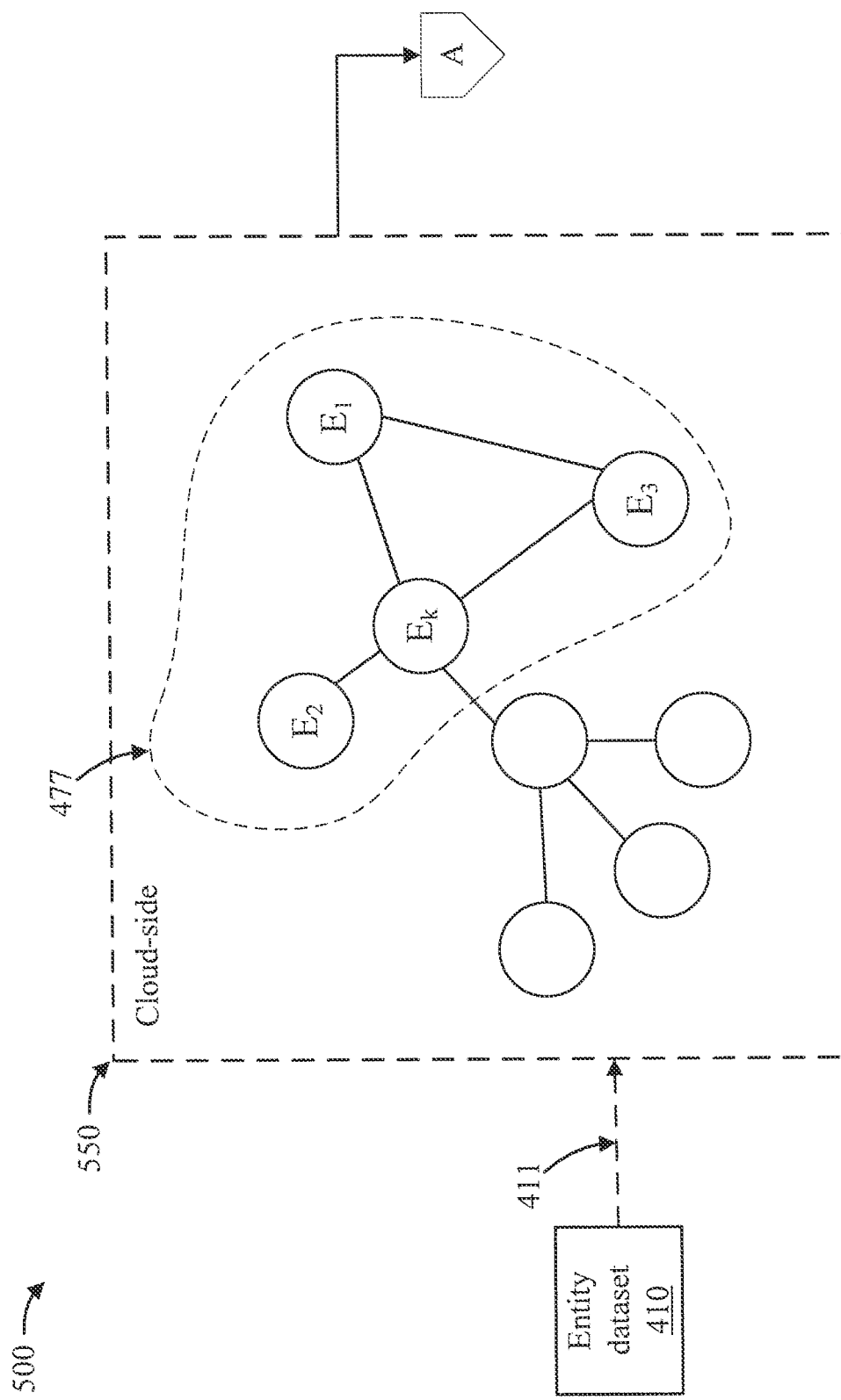
FIG. 5-6 are block diagrams showing an exemplary framework of a Modular Network based Knowledge Sharing Model (MNKS), in accordance with an embodiment of the present invention.
Figure 6:
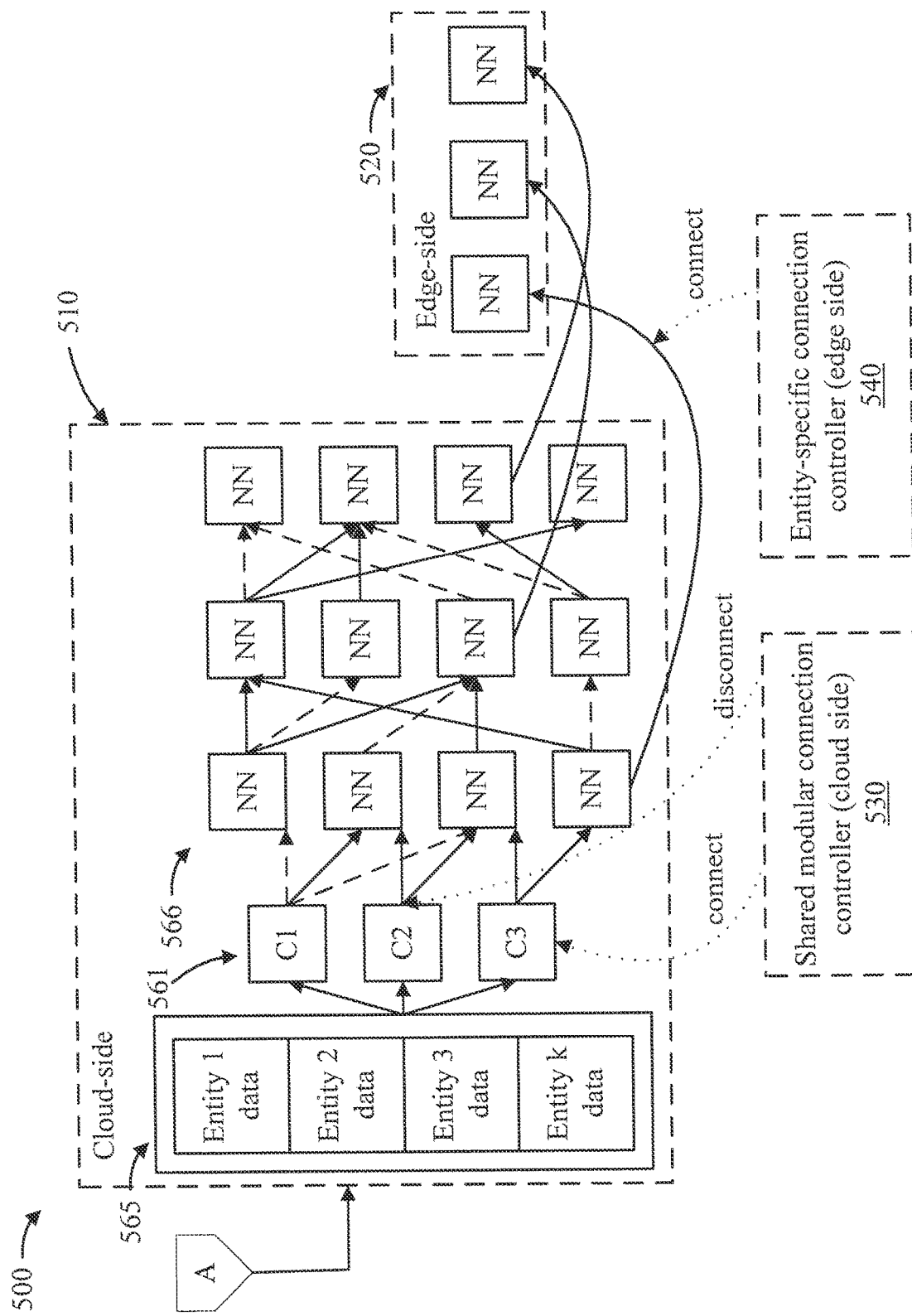

The present invention provides a Modular Network based Knowledge Sharing Model (MNKS) to work on cross-entity transfer learning. FIGS. 5-6 are block diagrams showing an exemplary framework of a Modular Network based Knowledge Sharing Model (MNKS) 500, in accordance with an embodiment of the present invention. Figure reference numeral 565 denotes the input data from different entities. These entities are different individuals but they share some common features, e.g., the entities can be the cars of the same make, but they are driven by different users and have different sensor readings.

The MNKS 500 includes the following two major components: (1) an entity-shared modular 510; and (2) an entity-specific decoder 520. The binary connection decisions in the entity-shared modular 510 and the entity-specific decoder 520 are made by a shared modular connection controller 530 and an entity-specific connection controller 540, respectively. The basic running process is that MNKS determine task-specific graph according to the task and data scenario. The scope of transfer is based on the local community where the entity is located. Entity-shared modular along with the shared modular connection controller 530 run in the cloud side to extract common knowledge. The entity-specific decoder 520 and the entity-specific connection controller 540 run in the edge-side to keep personalized features. "NN" denotes a neural network. C (as in C1 through C3) denotes an encoder network to retrieve features from the input data, such as LSTM or convolution network.

A description will now be given regarding transfer scope 550, in accordance with an embodiment of the present invention.

Different from traditional transfer learning, the number of entities in cross-entity transfer learning is much larger than the number of domains in traditional transfer learning. The differences among entities are usually much greater than the discrepancy among domains.

However, the divergence between the joint distributions (PS (X) in the source and PT (X) in the target entity) is the root of negative transfer. The usual case is where there exists some "systematic similarity" between PS (X) and PT (X). If there is no similarity between PS (X) and PT (X), and the algorithm instead relies on the divergent part, then the negative transfer is inevitable. Therefore, we need to determine the scope of transfer instead of using all entities, because most entities are too divergent and there is not much common knowledge to transfer.

In MNKS, a defined task-specific graph is utilized to measure the similarity among entities. The connections in the task-specific graph reflect the common attributes between entities. Based on the connection of the task-specific graph, local communities can be determined. Entities in the same local community are more relevant because they share common attributes, which ensure there exists some systematic similarity. The scope of transfer is defined as the local community where the entity is located.

Definition 1. (Task-specific Graph): The task-specific graph can be defined as $G=\{V, L\}$ where the link set $L$ involves the attribute links between nodes.

Here, nodes in $V$ are entities, while the link can be determined by the specific task manually.

A description will now be given regarding the entity shared modular 510 of FIG. 5, in accordance with an embodiment of the present invention.

The entity-shared modular 510 is responsible for learning the common knowledge within the transfer scope. The entity-shared modular 510 follows the similar philosophy of modular networks, which aims to learn a set of assembled sub-networks 566. The sub-networks 566 in the entity-shared modular 510 can be assembled in different ways for different target entities. Modularity enables the entity-shared modular 510 to have enough capability to extract common knowledge from transfer scopes of varying sizes.

The entity-shared modular 510 has m layers and each layer $\alpha \in \{1, 2, \ldots, m\}$ includes $q\alpha$ sub-networks. Its first layer, namely the input layer, is determined by the type of input data. For example, it can be a group of convolutional neural nets when processing image data, meanwhile, it can a group of independent LSTM cells when processing sequence data. The basic component of other layers is the MLP block, but they can also be designed more flexibly as needed.

A description will now be given regarding the independent cells of the input layer, in accordance with an embodiment of the present invention.

The input data of the entity-shared modular 510 includes all source entities' data 510A (include the target entity itself), which can be denoted as $X_{S+T}$. The input layer includes q1 cells 510B and each cell has its own independent operating to model the input data. The input data $X_{S+T}$ is processed by the cell Ci to output the hidden representation hi as follows:

$$h_i = C_i(X_{S+T}; \theta_{C_i})$$

A description will now be given regarding assembling the entity-shared modular 510, in accordance with an embodiment of the present invention.

The assembly methods for sub-networks 566 are different and learnable for different transfer scopes. The decision connections 561 between sub-networks of the entity-shared modular 510 are decided by the shared modular connection controller M 530. In essence, M is a function which selects from connection options between layers when given input. The present invention represents the function via a neural network parameterized by $\theta M$. Specifically, for sub-network i in layer $\alpha$ having the output ui, the shared modular connection controller M 530 estimates a binary decision vector $\zeta_i \in B^{q\alpha+1}$, where $B=\{0, 1\}$, $q\alpha+1$ is the number of sub-networks in layer $\alpha+1$, and $$\zeta_i = \mathcal{M}(u_i, \alpha; \theta_M).$$

For every sub-network j in layer $\alpha+1$, $\zeta_i[\ ]$ indicates whether subnetwork i in layer $\alpha$ connects ($\zeta_i[\ ]=1$) or disconnects ($\zeta_i[j]=0$) it. The connection controlling can be viewed as a reinforcement learning (RL) process.

A description will now be given regarding dataflow between sub-networks of the entity shared modular 510, in accordance with an embodiment of the present invention.

Each sub-networks j in layer $\alpha+1$ receives a list of $q\alpha$ tuples of features from the subnetworks in layer $\alpha$. The tuple can be denoted as $(u, \zeta_i)$. Based on the list of $q\alpha$ tuples, the input vj and output $\hat{u}_j$ should be calculated as follows:

$$v_j = \sum_{i=1}^{q_\alpha} \left( \frac{1}{\sum_{k=1}^{q_\alpha} \zeta_k[j]} \cdot \zeta_i[j] \cdot u_i \right)$$

$$\hat{u}_j = MLP(v_j)$$

A description will now be given regarding the entity-specific decoder 520, in accordance with an embodiment of the present invention.

The entity-specific decoder 520 is used to extract entity-specific information from the entity-shared modular 510. The mechanism is to filter entity-specific information from common knowledge through an effective assembly method between the decoder 520 and the entity-shared modular 510. The assembly method is decided by the entity-specific connection controller N 540. The entity-specific decoder D 520 includes of m−1 independent sub-decoders D, where $\beta \in \{1, 2, \ldots, m-1\}$.

Every sub-decoder $D\beta$ is used to extract the information from the $(\beta+1)$-th layer of the entity shared modular. The sub-decoder $D\beta$ is MLP block in MNKS, but it can also be designed more flexibly as needed.

A description will now be given regarding a MNKS learning process, in accordance with an embodiment of the present invention.

The MNKS employs an edge computing framework to ensure data privacy. Entity-shared modular 510 and shared modular connection controller 530 run on the cloud-side. The training process of them requires all the data with the transfer scope. It is chosen to pre-train them on the cloud-side and then deliver the learned entity-shared modular to the edge-side instead of directly sharing private data from all entities. Entity-specific decoder 520 and entity-specific connection controller 540 are trained on the edge-side using the target entity's data only. Entity-shared modular 510 and entity-specific decoder 520 can constitute the personalized model for the target entity, which is the objective of cross-entity transfer learning.

A description will now be given regarding cloud-side pre-training, in accordance with an embodiment of the present invention.

The input of pre-training cloud-side includes all source entities' historical data 744 (include the target entity itself). The connection controlling can be viewed as a reinforcement learning process. The state s is the tuples $(u, \alpha)$ where ui is the output of sub-network i and $\alpha$ is the index of layer (initially 1). The actions a are the next layer block choice. Given a state $s=(u, \alpha)$, the connection controller makes a decision about which action to take. For the reinforcement learning process, the present invention designs rewards for training. There are two types of rewards in this reinforcement learning process: a final reward and an immediate reward. The final reward r final is a function of the network's performance.

For the sake of illustration, a focus is made on prediction tasks. We use negative loss(-RMSE(y,yˆ) as the final reward. In order to encourage the controller to use fewer sub-networks, the present invention uses (-δm) as the immediate reward. δ∈[0, 1] is a hyper-parameter and m is the number of connected sub-networks in the next layer. The reward can be denoted as follows:

$$R = r_{final} + \sum_{a=1}^{m-1} \sum_{i=1}^{q_a} r_i$$

After defining the reward, the shared modular connection controller 530 is trained using policy-gradient. This process is similar to the classic policy-gradient, the objective function is to maximize the reward.

Figure 7:
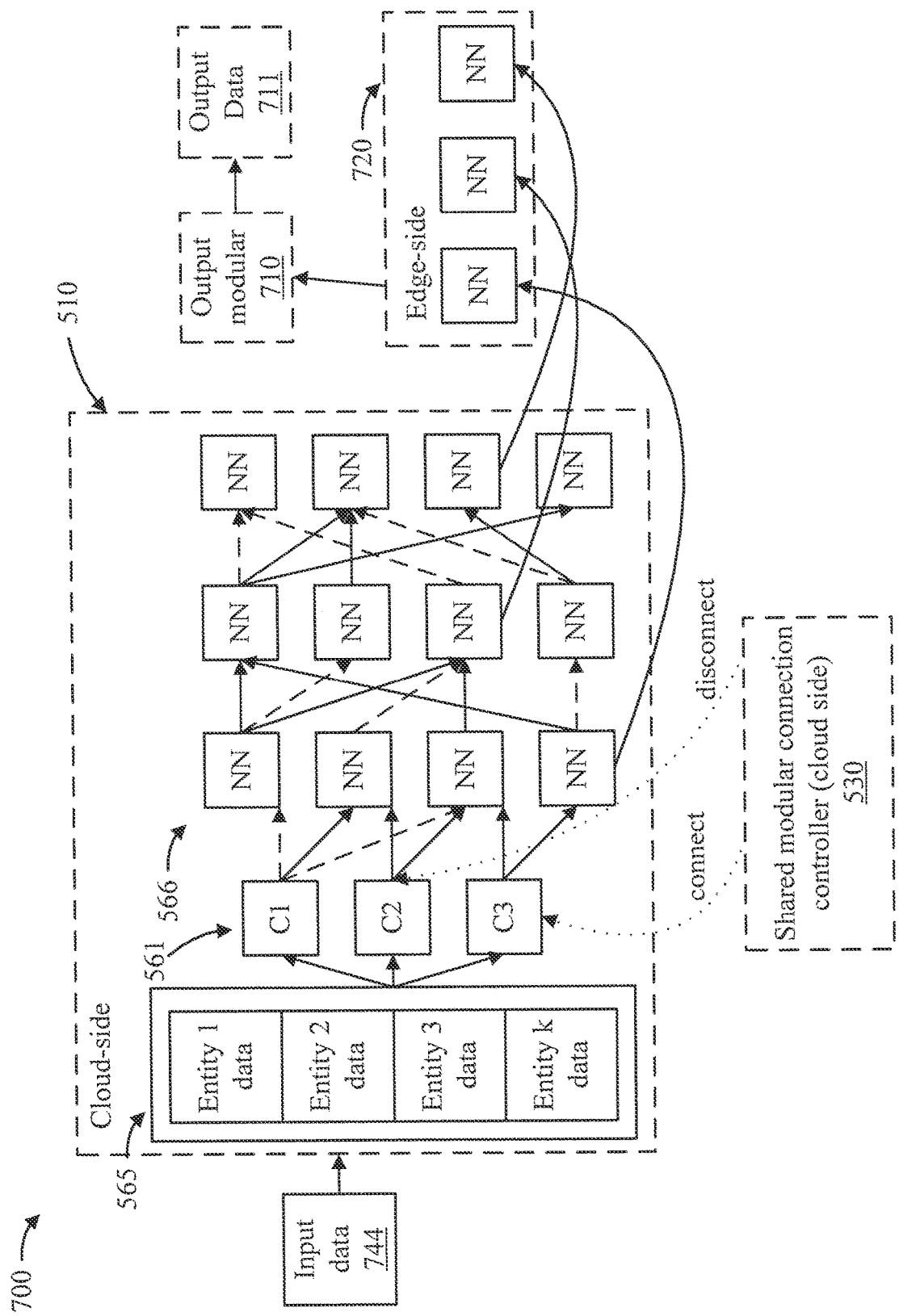
FIG. 7 is a block diagram showing an exemplary cloud-side pre-training process, in accordance with an embodiment of the present invention.

FIG. 7 is a block diagram showing an exemplary cloud-side pre-training process 700, in accordance with an embodiment of the present invention. As shown in FIG. 7, the shared decoder 720 here is assigned for pre-training. Since there is no need to distinguish between entities during pre-training, here we use fully connection for the shared decoder 720. The shared decoder 720 serves for pre-training only. Here, the present invention also allocates an output modular 710 to adapt to different task needs. The output modular 710 is a linear layer to transform the dimension of the shared decoder 520 to the desired output dimension. The output data 711 is obtained from the output modular 710. The entity-shared modular 510 and shared modular connection controller 530 are trained jointly. Its training method uses backpropagation to update the parameters in each subnetwork based on the loss RM(y,yˆ).

A description will now be given regarding edge-side learning, in accordance with an embodiment of the present invention.

The entity-specific connection controller 540 and entity-specific decoder 520 are trained with the target entity's data only. The connection controlling also can be viewed as a reinforcement learning process. The training of the reinforcement learning process is similar to the shared modular connection controller. But when training entity-specific connection controller, the entity shared modular 510 and shared modular connection controller 530 are frozen. The entity-specific decoder 520 is trained using backpropagation based on the loss RM(y,yˆ).

Figure 8:
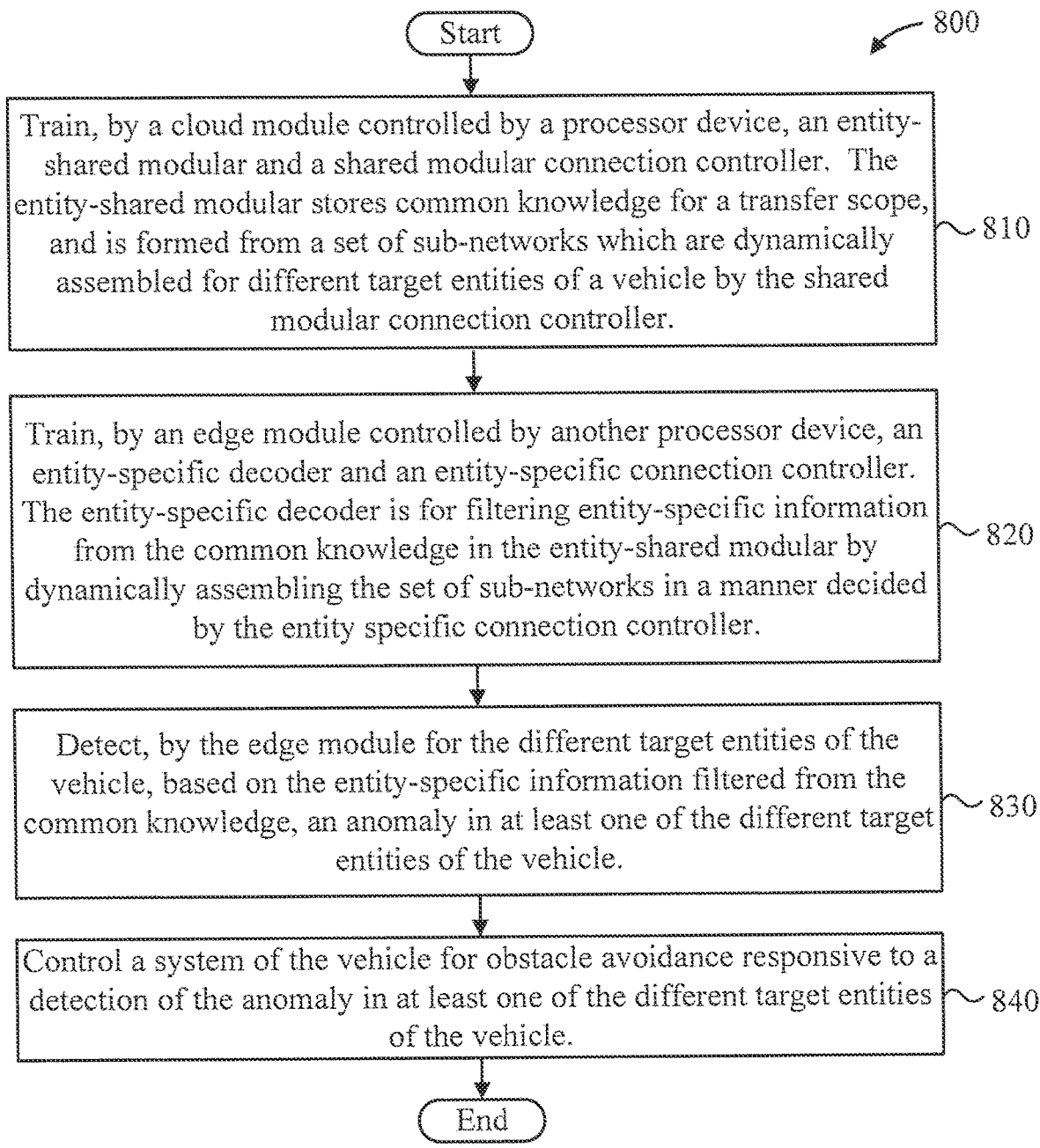
FIG. 8 is a flow diagram showing an exemplary method, in accordance with an embodiment of the present invention.

FIG. 8 is a flow diagram showing an exemplary method 800, in accordance with an embodiment of the present invention.

At block 810, train, by a cloud module controlled by a processor device, an entity-shared modular and a shared modular connection controller. The entity-shared modular stores common knowledge for a transfer scope, and is formed from a set of sub-networks which are dynamically assembled for different target entities of a vehicle by the shared modular connection controller.

At block 820, train, by an edge module controlled by another processor device, an entity-specific decoder and an entity-specific connection controller. The entity-specific decoder is for filtering entity-specific information from the common knowledge in the entity-shared modular by dynamically assembling the set of sub-networks in a manner decided by the entity specific connection controller.

At block 830, detect, by the edge module for the different target entities of the vehicle, based on the entity-specific information filtered from the common knowledge, an anomaly in at least one of the different target entities of the vehicle.

At block 840, control a system of the vehicle for obstacle avoidance responsive to a detection of the anomaly in at least one of the different target entities of the vehicle. The system of the vehicle can be any of steering, accelerating, braking, stability control, and so forth. The system of the vehicle can be one of the different target entities.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for vehicle fault detection, comprising:
training, by a cloud module controlled by a processor device, an entity-shared modular and a shared modular connection controller, the entity-shared modular storing common knowledge for a transfer scope, the transfer scope being based on a local community where an entity is located, and formed from a set of sub-networks which are dynamically assembled for different target entities of a vehicle by the shared modular connection controller, and the shared modular connection controller connects the sub-networks; and
training, by an edge module controlled by another processor device, an entity-specific decoder, an entity-specific connection controller, and an output module, the entity-specific decoder for filtering entity-specific information from the common knowledge in the entity-shared modular by dynamically assembling the set of sub-networks in a manner decided by the entity specific connection controller, the output module transforms a dimension of the shared decoder to an output dimension to adapt to different task needs, wherein the entity-shared modular and the entity-specific decoder form a task-specific graph using task and data scenarios.

2. The method of claim 1, further comprising detecting, by the edge module based on the entity-specific information filtered from the common knowledge, an anomaly in at least one of the different target entities of the vehicle.

3. The method of claim 1, further comprising controlling a system of the vehicle for obstacle avoidance responsive to a detection of the anomaly in at least one of the different target entities of the vehicle.

4. The method of claim 3, wherein the system of the vehicle is selected from a group consisting of steering, accelerating, and braking.

5. The method of claim 1, wherein the entity-shared modular and the shared modular connection controller are jointly trained.

6. The method of claim 1, wherein the entity-specific controller and the entity-specific connection controller are trained only with the entity-specific information while excluding the common knowledge.

7. The method of claim 1, wherein parameters of the entity-shared modular and the shared modular connection controller are frozen while training the entity-specific connection controller.

8. The method of claim 1, wherein the task-specific graph measures a similarity between the different target entities such that connections in the task-specific graph reflect common attributes between the different target entities.

9. The method of claim 8, wherein nodes in the task-specific graph represent respective ones of the different target entities, and edges in the task-specific graph represent common attributes between respective pairs of the different target entities.

10. The method of claim 1, wherein the shared modular connection controller decides different decision connections between different layers having different ones of the sub-networks in the set.

11. The method of claim 1, wherein the shared modular connection controller and the entity-specific connection controller selectively make or break a connection with the entity-shared modular and the entity-specific decoder, respectively.

12. The method of claim 11, wherein the shared modular connection controller implements a reinforcement learning process using a reward in relation to making and braking the connection.

13. The method of claim 1, wherein the cloud module is pre-trained prior to the edge module.

14. The method of claim 1, wherein the entity-shared modular and the entity specific decoder form a personalized model for at least one of the different target entities.

15. A system for vehicle fault detection, comprising:
a cloud module, controlled by a processor device, for training an entity-shared modular and a shared modular connection controller, the entity-shared modular storing common knowledge for a transfer scope, the transfer scope being based on a local community where an entity is located, and formed from a set of sub-networks which are dynamically assembled for different target entities of a vehicle by the shared modular connection controller, and the shared modular connection controller connects the sub-networks; and
an edge module controlled by another processor device, for training an entity-specific decoder, an entity-specific connection controller, and an output module, the entity-specific decoder for filtering entity-specific information from the common knowledge in the entity-shared modular by dynamically assembling the set of sub-networks in a manner decided by the entity specific connection controller, the output module transforms a dimension of the shared decoder to an output dimension to adapt to different task needs, wherein the entity-shared modular and the entity-specific decoder form a task-specific graph using task and data scenarios.

16. The system of claim 15, wherein the edge module detects an anomaly in at least one of the different target entities of the vehicle, based on the entity-specific information filtered from the common knowledge.

17. The system of claim 15, wherein the edge module interacts to initiate a control of a system of the vehicle for obstacle avoidance responsive to a detection of the anomaly in at least one of the different target entities of the vehicle.

18. The system of claim 17, wherein the system of the vehicle is selected from a group consisting of steering, accelerating, and braking.

19. The system of claim 15, wherein the entity-shared modular and the shared modular connection controller are jointly trained.

20. The system of claim 15, wherein the entity-specific controller and the entity-specific connection controller are trained only with the entity-specific information while excluding the common knowledge.

* * * * *